United States Patent [19]

Kato et al.

[11] Patent Number: 5,032,672

[45] Date of Patent: Jul. 16, 1991

[54] PROCESS FOR PREPARING POLYL(PHENYLENE SULFIDE)

[75] Inventors: Toshikazu Kato; Hiroshi Inoue; Kensuke Ogawara, all of Mie, Japan

[73] Assignees: Tosoh Corporation, Yamaguchi; Toso Susteel Co., Ltd., Tokyo, both of Japan

[21] Appl. No.: 361,201

[22] Filed: Jun. 5, 1989

[30] Foreign Application Priority Data

Jun. 3, 1988 [JP] Japan .................................. 63-135702

[51] Int. Cl.$^5$ ............................................. C08G 75/14
[52] U.S. Cl. .................................................... 528/388
[58] Field of Search ......................................... 528/388

[56] References Cited

U.S. PATENT DOCUMENTS 3,354,129  11/1967  Edmonds et al. .
3,887,529  6/1975  Rohlfing .

FOREIGN PATENT DOCUMENTS 0256757  2/1988  European Pat. Off. .
0272812  6/1988  European Pat. Off. .
0281406  7/1988  European Pat. Off. .

Primary Examiner—Morton Foelak
Attorney, Agent, or Firm—Sughrue, Mion, Zinn, Macpeak & Seas

[57] ABSTRACT

An improved process for preparing poly(phenylene sulfide) is provided. In the process, an additional amount of solvent is introduced into the reaction mixture, when a conversion of at least 80% of dihalobenzene, one of the reactants, has been achieved. By the measure, heavy scaling which has been experienced with the conventional processes is effectively inhibited.

10 Claims, No Drawings

PROCESS FOR PREPARING POLY(PHENYLENE SULFIDE)

This invention relates to an improved process for preparing poly(phenylene sulfide) which is freed from the problems due to scale built-up onto the walls of the reactor vessel or other equipments.

The reaction product slurry resulting from the process may be passed through a pipe line without clogging.

The polymers produced by the present process have been found to be free of large agglomerates and to have a fairly uniform particle size.

Poly(phenylene sulfide) exhibits excellent heat and chemical resistance properties and, hence, has attracted a good deal of attention as a material for producing articles such as parts in electrical and electronic instruments and automotive parts. The polymer has been used in fields where high heat and chemical resistance properties are required.

A method of production of poly(phenylene sulfide) is disclosed in Japanese Patent Publication (KOKOKU) No. 45-3368, which method comprises reacting a dihalobenzene with an alkali metal sulfide in an organic polar solvent such as N-methyl pyrrolidone. However, in production of poly(phenylene sulfide) by this prior method, there would be such difficulties that a significant amount of scales are deposited on the walls of the reactor and that the deposited scales comprising mainly of poly(phenylene sulfide) will exfoliate and fall into the reacted slurry. If the method is employed for commerical production of poly(phenylene sulfide), the scale built-up would make cleaning of the reactor vessel difficult, the fallen scales would clog a pipe line through which the reacted slurry is passed, and the resulting polymer product would contain large agglomerates.

However, no approaches addressed to inhibit or prevent the formation and deposition of the scales have been proposed.

We have concentrated our effort to solve or substantially obviate the scale built-up problems. Now we have found that the formation of scales and their deposition onto the walls of the reactor vessel are conveniently and effectively inhibited by addition of an organic polar solvent to the reaction mixture at later stage of the poly(phenylene sulfide) synthesis process. The present invention is based on this finding.

Accordingly, the present invention provides an improved process for preparing poly(phenylene sulfide) resins comprising reacting a dihalobenzene with an alkali metal sulfide in a polar organic solvent, wherein when a conversion of at least 80% of the dihalobenzene has been achieved in the reaction system, an additional amount of a polar organic solvent, which may be the same as or different from the initially present organic solvent, is introduced to the reaction mixture and then the reaction is allowed to continue further.

The invention will be described in more detail.

Examples of the dihalobenzenes which may be used in the invention include p-dihalobenzenes, such as p-dichlorobenzene, p-dibromobenzene and p-di-iodobenzene. Particularly preferred is p-dichlorobenzene.

The p-dihalobenzenes may be used in combination with up to about 30 mole % (on the base of the dihalobenzenes) of other dihaloaromatic comonomer compounds, for example m-dihalobenzenes (e.g. m-dichlorobenzene), o-dihalobenzenes (e.g. o-dichlorobenzene), dichloronaphthalene, dibromonaphthalene, dichlorodiphenyl sulfone, dichlorobenzophenone, dichlorodiphenyl ether, dichlorodiphenyl sulfide and dichlorodiphenyl sulfoxide, where random or block copolymers will be produced.

Provided that the linearity of the product polymer is not significantly disturbed, a minor proportion of polyhaloaromatic compounds containing 3 or more halogen atoms, for example, trichlorobenzene, tribromobenzene, triiodobenzene, tetrachlorobenzene, trichloronaphthalene and tetrachloronaphthalene, may be used in addition to the dihalobenzene component in the process.

Examples of the alkali metal sulfides which may be used in the invention include sulfides of lithium, sodium, potassium, rubidium and cesium and mixtures thereof which may be used in the hydrate form. The alkali metal sulfide may be prepared by reacting an alkali metal hydrosulfide with an alkali metal base or reacting hydrogen sulfide with an alkali metal base. In the present process, the alkali metal sulfide may be formed in situ prior to introduction of the dihaloaromatic compound into the reaction system. Of course, the sulfide may be prepared outside the reaction system and then introduced to the system. Of the above-listed alkali metal sulfides, sodium sulfide is preferably used in the process.

Before the reaction is started with the dihalobenzene introduced, preferably the water content in the reaction system should be controlled at a level of less than about 4 moles water per mole of the alkali metal sulfide present, for example by means of distillation. If necessary, the water content may be controlled to a desired level during the process.

The reaction medium solvent used in the process is an organic polar solvent, preferably an aprotic solvent which is stable against alkali at high temperatures. Examples of the solvents which may be mentioned include N,N-dimethyl acetamide, N,N-dimethyl formamide, hexamethylphosphoramide, N-methyl-$\epsilon$-caprolactam, N-ethyl-2-pyrrolidone, N-methyl-2-pyrrolidone, 1,3-dimethylimidazolidinone, dimethyl sulfoxide, sulfolane, tetramethyl urea and mixtures thereof.

Preferably the molar ratio of the alkali metal sulfide to the dihalobenzene ranges from 1.00:0.90 to 1.00:1.10.

The quantity of the organic polar solvent (or solvents) used in the process may be such that the product polymer will present in a proportion of about 3-60%, preferably 7-40% by weight in the reaction mixture on completion of the reaction.

The present process may be effected with stirring at a temperature in the range of usually about 200°-300° C., preferably 210°-270° C. for a period of 0.5-20 hours. Use of reaction temperatures lower than about 200° C. can lead to an unacceptably low reaction rate. When the reaction temperature is higher than about 300° C., the product polymer tends to undesirably degrade.

The organic polar solvent that is added to the reaction system at later stage of the process when a conversion of at least 80% of the dihalobenzene has been achieved, may be one of the above-listed reaction medium solvents, for example N,N-dimethyl acetamide, N,N-dimethyl formamide, hexamethyl phosphoramide, N-methyl-$\epsilon$-caprolactam, N-ethyl-2-pyrrolidone, N-methyl-2-pyrrolidone, 1,3-dimethyl imidazolidinone, dimethyl sulfoxide, sulfolane, tetramethyl urea or a mixture thereof. The organic polar solvent added at the later stage is preferably the same as the initially present reaction medium solvent on account of ease of the subsequently occurring solvent-separation and -purification procedure.

The additional organic polar solvent is introduced to the reaction system, when a conversion of at least 80%, preferably at least 90%, of the dihalobenzene has been achieved in the reaction system. When the conversion is less than 80%, the scale-formation and -deposition is poorly inhibited.

Herein, the conversion of dihalobenzene (referred to as DHB hereinafter) is determined, for example, by gas chromatography and calculated according to the following equation:

$$\text{Conversion}(\%) = 100 - \{[\text{unreacted DHB (moles)} - \text{excess DHB (moles)} - \text{AMS disappeared on dehydration (moles)}]/\text{charged DHB (moles)}\} \times 100$$

wherein "AMS" represents an alkali metal sulfide; "AMS disappeared on dehydration" means the amount of AMS which is decomposed into hydrogen sulfide and becomes unavailable for the reaction when AMS is partially dehydrated in the organic polar solvent; "excess DHB" represents a stoichimetrically excess amount of DHB with respect to AMS where the former is charged in excess of the latter.

After introduction of the additional organic polar solvent to the reaction system, the reaction is allowed to continue for a further period of about 0.1–5 hours with stirring.

The amount of the additional polar organic solvent is usually in the range of about 5–50 parts by weight per 100 parts by weight of the polymerization solvent initially present in the reaction system. If the amount is less than about 5 parts by weight, the formation and deposition of the scales will be poorly inhibited. Where the amount is greater than about 50 parts by weight, the separation and recovery of the solvent from the reaction mixture will be very expensive.

In the present process, if desired, an auxilliary agent such as an organo alkali metal carboxylate may be added to form a polymeric product of increased molecular weight.

The product polymer may be recovered from the resulting reaction mixture by conventional techniques. For example, the solvent may be recovered by distillation or flashing-off and the residue is then washed with an organic solvent and water to give the product polymer. Alternatively, the reaction mixture may be cooled and filtered to separate and recover the solvent from the crude polymer product which is then washed.

The product polymer according to the present invention may be heat treated before use. The polymer may be used without pre-heat treatment. The polymer may be mixed with any additive before use, for example, reinforcing fillers, such as ceramic fibers (e.g., glass, carbon or alumina fibers), aramide fibers, wholly aromatic polyester fibers, metallic fibers and whiskers (e.g., of potassium titanate); inorganic fillers such as calcium carbonate, mica, talc, silica, barium sulfate, calcium sulfate, kaolin, clay, pyroferrite, bentonite, sericite, zeolite, nepheline syenite, attapulgite, wollastonite, ferrite, calcium silicate, magnesium carbonate, antimony trioxide, zinc oxide, titanium oxide, magnesium oxide, iron oxides, molybdenum disulfide, graphite, gypsum, glass beads, powdered glass, glass balloons, quartz; and organic and inorganic pigments.

Further, conventional additives, for example, plasticizers, mold release agents, silane or titanate coupling agents, lubricants, heat stabilizers, weathering agents, nucleating agents, blowing agents, ion-trapping agents, flame-retardants and flame-proofing aids may be incorporated, if desired.

The poly(phenylene sulfide) products of the present invention may be blended with one or more of homopolymers and random or block-graft copolymers based on, for example, polyethylene, polybutadiene, polyisoprene, polychloroprene, polystyrene, polybutene, poly α-methylstyrene, polyvinyl acetate, polyvinyl chloride, poly acrylates, polymethacrylates, polyacrylonitrile, polyamides (e.g., nylon 6, nylon 66, nylon 610, nylon 12, nylon 46), polyesters (e.g., polyethylene terephthalate, polybutylene terephthalate, polyarylate), polyurethanes, polyacetals, polycarbonates, polyphenylene oxide, polysulfones, polyethersulfones, poly(phenylene sulfide sulfone), polyaryl sulfones, polyether ketones, polyether ether ketones, poly(phenyl sulfide ketone), polyimides, polyamide imides, silicone resins, phenoxy resins and fluorine resins.

The invention will be illustrated in more detail with reference to the following examples which are presented only for illustrative purposes but not for restriction of the invention thereto.

In the Examples, the melt viscosities of the product polyphenylene sulfides were measured in a KOHKA type flow tester (with a die having a diameter of 0.5 mm and a length of 2 mm) at 300° C. using a load of 10 kg.

EXAMPLE 1

A 2 liter capacity autoclave provided with a stirrer was charged with 480 g of N-methyl pyrrolidone and 2.0 moles of sodium sulfide ($Na_2S - 2.7H_2O$) and heated with stirring so as to dehydrate until an internal temperature of 210° C. was achieved. By this heating, a distillate comprised essentially of water was removed in an amount of 79.3 g, while 0.069 moles of sodium sulfide was decomposed into hydrogen sulfide and become unavailable for the reaction.

Then, 2.0 moles of p-dichlorobenzene (referred to as p-DCB) and 150 g of N-methyl pyrrolidone were added. The resulting mixture was heated to 250° C. over a period of one hour with stirring and allowed to react at 250° C. for 3 hours. A small portion of the reaction mixture slurry was sampled and the proportion of unreacted p-DCB remaining in the slurry was determined by gas chromatography. The conversion of p-DCB was calculated to be 100% according to the hereinbeforementioned equation.

Then, into the reactor, 150 g of N-methyl pyrrolidone was added and the mixture was maintained at 250° C. for a further 15 minutes with stirring. Then the reaction was stopped by cooling. There was no deposition of scales to the inner walls of the autoclave and to the stirrer.

The resulting slurry was filtered and washed thoroughly with methanol followed by warm water and then dried overnight at 100° C. Yield of the polymer was 97%. The polymer had a melt viscosity of 30 Pa.s as measured in the KOHKA type flow tester.

The product polymer was passed through a 22 mesh (710 μ) sieve with no fraction being retained thereon.

EXAMPLE 2

The procedure as described in Example 1 was repeated except that the reaction was first conducted at 250° C. for 1 hour and then the N-methyl pyrrolidone was added and the reaction was allowed to continue at 250° C. for a further 2 hours.

After the first stage of reaction (at 250° C. for 1 hour) but before the introduction of additional N-methyl pyrrolidone, a conversion of 94% of the p-DCB was observed. The polymer yield was 96%. The melt viscosity was 20 Pa.s.

There was no deposition of scales onto the apparatus. The polymer product passed completely through the sieve.

COMPARATIVE EXAMPLE 1

The procedure of Example 1 was repeated with omission of the addition of N-methyl pyrrolidone after the first stage of reaction at 250° C. for 3 hours.

The conversion of p-DCB was 100% and the yield of product polymer was 96%. The polymer had a melt viscosity of 25 Pa.s.

A significant deposition of scales onto the inner walls of the reaction vessel and onto the stirrer was observed.

In the sieving test, 2.3% by weight of the polymer was retained on the sieve.

COMPARATIVE EXAMPLE 2

The procedure of Example 1 was repeated except that the additional N-methyl pyrrolidone was introduced when the temperature of the mixture had reached 250° C. and, then the mixture was maintained at 250° C. for a further 3 hours.

When the additional N-methyl pyrrolidone was introduced, a conversion of 70% of the p-DCB had been achieved.

The polymer was obtained at a yield of 96% and had a melt viscosity of 20 Pa.s.

There was observed a deposition of scales onto the inner walls of autoclave.

In the sieving test, 1.0% by weight of the polymer was retained on the sieve.

EXAMPLE 3

The procedure of Example 1 was repeated except that the amount of additional N-methyl pyrrolidone introduced after 3 hours of the first stage reaction at 250° C. was decreased to 100 g.

The polymer was produced at a yield of 97% and had a melt viscosity of 25 Pa.s.

There was no deposition of scales onto the inner walls of reactor. No polymer was retained on the sieve.

COMPARATIVE EXAMPLE 3

The procedure of Example 1 was repeated except that the additional N-methyl pyrrolidone introduced after 3 hours of the first stage reaction at 250° C. was added in an amount of 20 g.

The polymer was produced at a yield of 97% and had a melt viscosity of 25 Pa.s. There was observed a deposition of scales onto the inner walls of autoclave. On the sieve, 1.5% by weight of the polymer was retained.

From the foregoing, it is apparent that the by present process the formation of scales and the deposition thereof onto the inner walls of reactor and onto the other apparatuses are effectively inhibited. Further, the polymers produced according to the process are substantially free of undesirably large aggromerates and exhibit substantially uniform particle sizes.

What is claimed is:

1. An improved process for preparing poly(phenylene sulfide) resins comprising reacting a dihalobenzene with an alkali metal sulfide in a polar organic solvent, wherein when a conversion of at least 80% of the dihalobenzene has been achieved in the reaction system, an additional amount of about 5-50 parts by weight per 100 parts by weight of polymerization solvent initially present in the reaction system, of a polar organic solvent, which may be the same as or different from the solvent initially present in the system, is introduced to the reaction mixture and then the reaction is allowed to continue further.

2. A process according to claim 1 wherein the additional solvent is the same as the solvent initially present in the reaction system.

3. A process according to claim 1 or 2 wherein the additional solvent is introduced in a proportion of about 5-50 parts by weight per 100 parts by weight of the solvent initially present in the reaction system.

4. A process according to claim 1 wherein the additional solvent is introduced when a conversion of at least 90% of the dihalobenzene has been achieved.

5. A process according to claim 1 wherein the additional solvent is selected from the group consisting of N,N-dimethyl acetamide, N,N-dimethyl formamide, hexamethyl phosphoramide, N-methyl-ε-caprolactam, N-ethyl-2-pyrrolidone, N-methyl-2-pyrrolidone, 1,3-dimethyl imidazolidinone, dimethyl sulfoxide, sulfolane and tetramethyl urea and mixtures thereof.

6. A process according to claim 5 wherein the additional solvent is the same as the solvent initially present in the reaction system.

7. A process according to claim 6 wherein the additional solvent is N-methyl pyrrolidone.

8. A process according to claim 1 wherein the reaction is conducted at 200°-300° C. for a period of 0.5-20 hours in total.

9. A process according to claim 8 wherein the reaction temperature is in the range of 210°-270° C.

10. A process according to claim 8 wherein the total amount of the organic solvent or solvents used is such that the product polymer is present in a proportion of 3-60% by weight in the reaction mixture on completion of the reaction.

* * * * *

UNITED STATES PATENT AND TRADEMARK OFFICE
CERTIFICATE OF CORRECTION

PATENT NO. : 5,032,672
DATED : July 16, 1991
INVENTOR(S) : Toshikazu Kato, Hiroshi Inoue, and Kensuke Ogawara It is certified that error appears in the above-identified patent and that said Letters Patent is hereby corrected as shown below:

On the title page:

In the title of the invention, delete "POLYL(PHENYLENE SULFIDE)" and insert --POLY(PHENYLENE SULFIDE)--.

Signed and Sealed this

Sixth Day of April, 1993

Attest:

STEPHEN G. KUNIN

Attesting Officer

Acting Commissioner of Patents and Trademarks